US006125409A

United States Patent [19]
Le Roux

[11] Patent Number: 6,125,409
[45] Date of Patent: Sep. 26, 2000

[54] METHOD FOR FUNCTIONALITY DOWNLOADING DIRECTLY FROM A COMPUTER TO A VOLATILE MEMORY OF A PCMCIA CARD USING DIRECT MEMORY ACCESS

[76] Inventor: Jean Yves Le Roux, Chemin des Côtes, 13600 Ceyreste, France

[21] Appl. No.: 09/029,521

[22] PCT Filed: Sep. 5, 1996

[86] PCT No.: PCT/FR96/01358

§ 371 Date: Apr. 7, 1998

§ 102(e) Date: Apr. 7, 1998

[87] PCT Pub. No.: WO97/09677

PCT Pub. Date: Mar. 13, 1997

[30] Foreign Application Priority Data

Sep. 5, 1995 [FR] France ................................ 95 10637

[51] Int. Cl.⁷ .................................................. G06F 13/14
[52] U.S. Cl. .................... 710/22; 710/12; 710/23; 710/52; 710/58; 710/102; 711/102; 711/104
[58] Field of Search .................... 710/12, 21–23, 710/52, 102, 58, 35; 395/282; 711/102–104

[56] References Cited

U.S. PATENT DOCUMENTS

| 5,038,025 | 8/1991 | Kodera | 235/492 |
| 5,212,369 | 5/1993 | Karlisch et al. | 235/380 |
| 5,285,781 | 2/1994 | Brodard | 607/59 |
| 5,563,400 | 10/1996 | Le Roux | 235/486 |
| 5,671,367 | 9/1997 | Le Roux | 395/282 |
| 5,737,610 | 4/1998 | Sandig et al. | 395/712 |
| 5,774,759 | 6/1998 | Tanaka | 399/8 |
| 5,887,145 | 3/1999 | Harari et al. | 710/102 |

FOREIGN PATENT DOCUMENTS

| 0 598 541 | 5/1994 | European Pat. Off. . |
| 0 628 908 | 12/1994 | European Pat. Off. . |

OTHER PUBLICATIONS by G.L. Cannon et al., "Downloadable pager Functionality", *Motorola Technical Developments*, vol. 18, Mar. 1993, Illinois, pp. 91–93.

"Host Channel Micro–Sequencer", *IBM Technical Disclosure Bulletin*, vol. 34, No. 4b, Sep. 1991, New York, pp. 209–211.

"Data Transfer Mechanism for Personal Computer Memory Card International Association Interface to Digital Signal Processor", *IBM Technical Disclosure Bulletin*, vol. 38, No. 2, Feb. 1995, New York, pp. 517–519.

*Primary Examiner*—Thomas C. Lee
*Assistant Examiner*—Thuan Du
*Attorney, Agent, or Firm*—Young & Thompson

[57] ABSTRACT

A method for downloading functions between a personal computer including one or more processors, a memory, an input/output unit and a communication unit, and a memory or input/output PCMCIA card having a buffer memory, a PCMCIA Interface is provided between the computer and the cared. The method loads into the buffer memory, through fast access to the memory, a function which is directly sent to the processor of the PCMCIA card for execution.

5 Claims, 2 Drawing Sheets

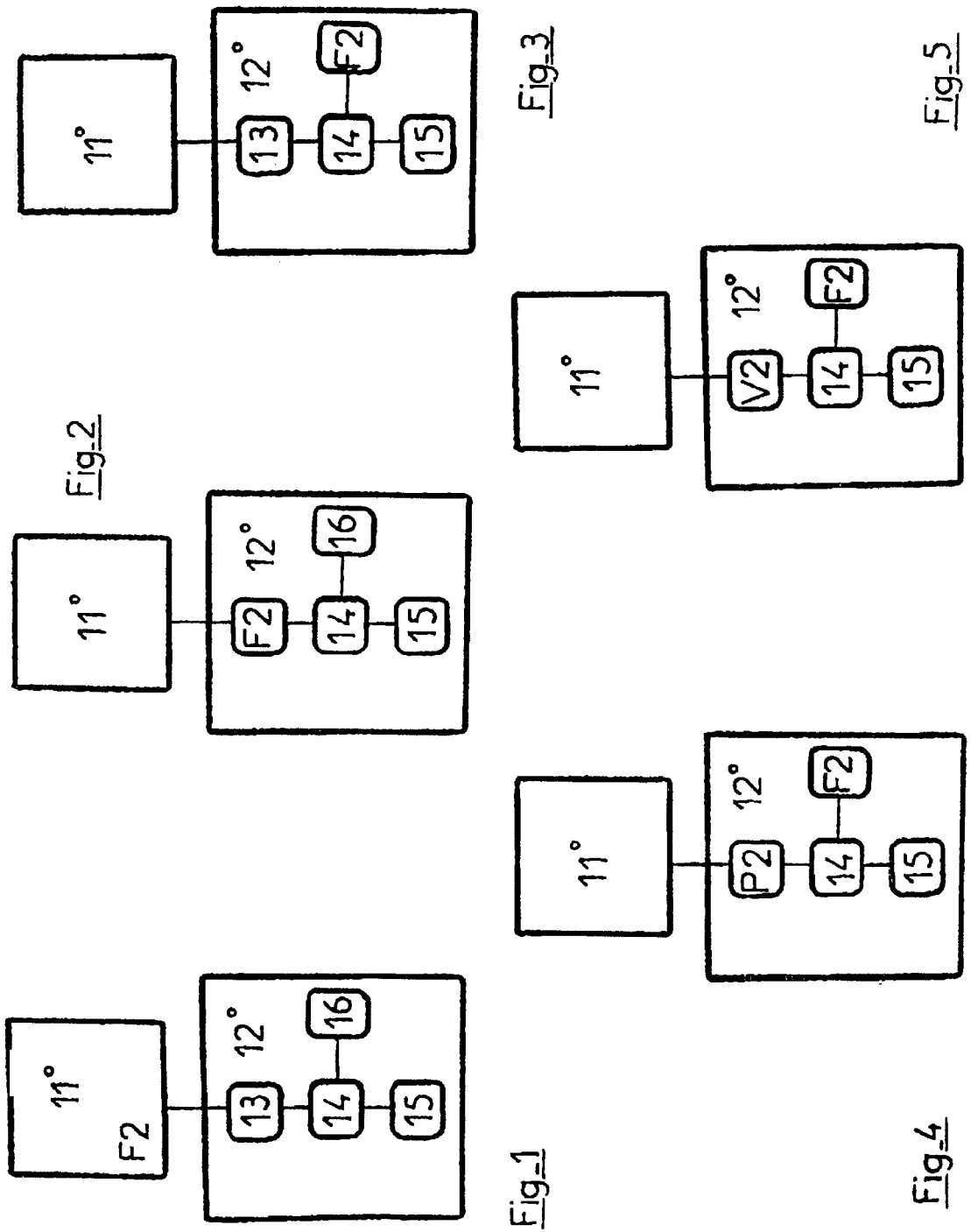

METHOD FOR FUNCTIONALITY DOWNLOADING DIRECTLY FROM A COMPUTER TO A VOLATILE MEMORY OF A PCMCIA CARD USING DIRECT MEMORY ACCESS

BACKGROUND OF THE INVENTION

The present invention provides a process for the remote loading of functions between a personal computer and a memory card. It also relates to the device which permits the performance of this process.

Description of the Related Art

The memory card used is of the PCMCIA type (personal computer memory card international association).

There exist at present numerous PCMCIA cards used throughout the world. This is a memory card but also a modem/fax card, a network (ethernet) card, a security or interface card for cards with chips. These other cards are commonly called I/O (input/output) cards.

When these cards must permit remote loading of new functions or improvement of existing functions, there is added to them a flash memory. This memory is therefore associated with the conventional constituents of a PCMCIA card, namely an interface, a processor and the electronics associated with each specific function.

The document EP-A-0 419 005 relates to an apparatus and a process to load a base input/output system (BIOS) memorized in a uniformly accessible storage of a personal computer system. The personal computer system comprises a system processor, a system card, a principal random access memory, a read only memory and at least one uniformly accessible storage. The read only memory comprises a first BIOS region and data representing the type of system processor and the configuration of the input/output of the system card. The first BIOS region starts the system and the uniformly accessible storage to read a master initiating block into the system from the uniformly accessible storage. The master initiating block comprises a data segment and an executable code segment. The data segment comprises data representing the system material and a system configuration which is supported by the master initiation block. The first BIOS region confirms that the master initiation block is compatible with the system material by verifying that the data from the data segment of the master initiation block are in accord with the system processor, the system card, and the input/output system configuration. If the master initiation block is compatible with the system material, the first BIOS region directs the system processor to execute the executable code segment of the master initiation block. The executable code segment confirms that the configuration of the system has not changed and loads into the rest of the BIOS region, from the uniformly accessible storage toward the random access memory. The executable code segment then verifies the authenticity of the rest of the BIOS region and directs the system processor to begin executing the BIOS now in the random access memory. The execution of the BIOS in the random access memory then initiates the user system to commence use of the personal computer system.

This document discloses that the data loaded into the buffer memory are recopied into a random access memory. This represents the case of the conventional systems in which a program is remotely loaded into an additional memory.

The document EP-A-0 598 541 provides a control device with programmable external storage. It requires minimum intervention of a microprocessor and has greater extent and flexibility. It comprises a buffer circuit which stores a control program for data transfer in addition to the data to be transferred between one side and an external storage means, a control device which reads from the buffer circuit toward the control device in response to an instruction from the host. The control device controls the transfer of data between the host and the external storage means independently of the microprocessor such that the microprocessor can execute other tasks.

The device described uses a "programmable" program region so as to provide basis for a transfer of data between a server and a hard disk. There is no possibility for instantaneous transfer of an immediately executable program by the target. Thus, a microprogram is necessarily loaded into the buffer memory, then executed by a microprocessor which sets the parameters of the sequencer of data transfer.

The document EP-A-0 628 908 discloses a personal computer memory card international association (PCMCIA) peripheral, for example of modem, shared memory serving as an interface for a personal computer. This shared memory interface has the capability of easily programming the PCMCIA peripheral, either in the factory, or in other places. Moreover, the shared memory interface avoids the need to have an initiation code in the PCMCIA peripheral. Finally, the interface permits transferring data introduced by the user of the personal computer, particularly a data terminal, to the PCMCIA modem with a higher rate of data transfer than that now available via the universal asynchronous reception/emission integrated circuit of the modems.

This document mentions the use of a programmable memory in a PCMCIA card loaded during initiation, which is to say before onset of use. It does not disclose the possibility of loading during execution of an application, nor the possibility of having rapid loading of the direct access type to the memory. There are hence two phases. A first initiation phase in which an initiation program must be loaded before use of the product. A second initiation phase in which the double access random access memory permits transferring the data between the server and the processor. This product is hence very "open" and therefore not secure. There is no control over the contents of this program. Moreover, during the initiation phase, it is not taught that the random access memory is loaded with new executable functions.

The patent EP-A-628,908 is representative of the prior art, because the executable functions reside permanently in the PCMCIA module, or any other thing. They cannot be modified other than making an "update". This is to say that there is needed a special tool to be able to modify them. In other words, internally, there is no flash memory which is reprogrammed.

In the process according to the invention, the functions are not contained in the PCMCIA module but they are in the HOST (PC).

The fundamental difference between the two processes is therefore in the location of the functions of patent EP-A-628,908: in the permanent module (even if it is "updatable"), in the process according to the invention: in the host (the functions are only those of passage) which is the object of the present invention.

SUMMARY OF THE INVENTION

The object of the invention therefore consists in a mechanism permitting the rapid loading of new functions into a volatile memory.

This process and the device for using it therefore permit increased flexibility of operation for PCMCIA cards, thus any new function can be implanted by simple addition of external software.

Moreover, the flash type memory, which is relatively cumbersome and not available quickly, is no longer indispensable to the operation of this type of memory card, which permits substantial reductions of cost and size.

The process for rapid remote loading of executable functional codes (F1) between on the one hand a personal computer comprising at least one processor, a memory, an input/output unit serving as a port and, on the other hand, a memory card or input/output card of the PCMCIA type comprising a buffer memory, a processor and a user device, a PCMCIA interface is present between the computer and the PCMCIA card, is characterized by the fact that it permits rapid remote loading of a function by direct access to the target processor (direct processor access function or DPA) of said PCMCIA card which can therefore be directed toward the user device for actuation.

The buffer memory is directly accessible in the processor of the PCMCIA card for execution by the processor, because the transmission channel of data is hard wired so that it will be directly executable by the processor, this data channel permitting loading of the DMA type, the host system (a personal computer in the specific case of a PCMCIA card), directly accesses the program space of the processor, there is accordingly a DPA mechanism (direct processor access); the exchange of functional code between the PC RAM and the internal RAM takes place as a DMA process, this process controls the access to the internal memory cases without having to position the address.

It consists in causing to reside all the functions in the personal computer and no longer in the PCMCIA and to execute them in the desired time by using the rapid loading of the DPA type; there is the same advantage in simultaneously loading the call and the execution of the function, the arguments of said function and the executable code of this function.

The BIOS program integrated into the processor (read only memory) permits rendering secure the use of the product.

During use, a new function is loaded by means of a rapid process between the server and the random access memory, then executed immediately by the processor under control of the program.

The program is replaced by an interpreter program; in this case, the preloaded function will be interpreted.

The PCMCIA interface can be replaced by any other interface of the same type such as the USB (Universal Serial Bus).

BRIEF DESCRIPTION OF THE DRAWINGS

The accompanying drawings are given by way of example but are non-limiting. They show a preferred embodiment according to the invention. They permit easy comprehension of the invention.

FIGS. 1 to 5 show the different steps of the remote loading of a function in the case of a personal computer and of a PCMCIA memory card according to the state of the art.

DESCRIPTION OF THE PREFERRED EMBODIMENTS

Figure 6:
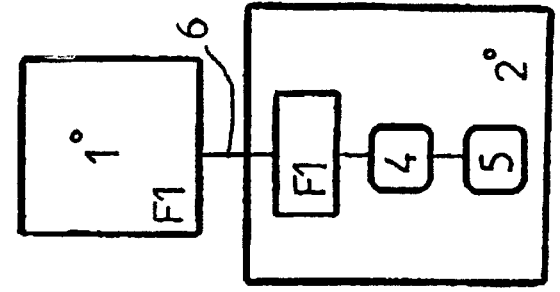
FIGS. 6 to 9 show the different steps of remote loading of a function in the case of a personal computer and a PCMCIA memory card according to the invention.

The present invention relates essentially to a buffer memory 3 which permits direct access to the processor 4 by a memory card of the PCMCIA type 2.

In contrast to a simple buffer memory 13 which is a space to which access is had by positioning suitably the address of the memory case that it is desired to read or write simultaneously with the reading or writing signs, the buffer memory 3 according to the invention, which is to say with direct access, permits accessing different memory cases without having to position the address.

In general, the principle used consists of an auto-incrementation of the address.

Upon each reading, the address pointer displaces "d' one unit".

Of course this principle is not limiting on the present invention.

This buffer memory with direct access to the processor 4 of the card 2 functions in a manner substantially similar to a uniformly accessible storage which is used to transfer data between one system and another.

This uniformly accessible storage system is therefore connected to the data bus of the two systems in question.

The memory with direct access to the processor is itself used to transfer the functions executable by the second system, which is to say the PCMCIA card 2.

The transfer is effected by a data bus between the first system, which is to say the personal computer 1, and the direct access device 2.

The card 2 can thus see the direct access device on its execution bus.

Said card 2 can therefore directly execute the function.

Turning now to the figures, there can be seen in FIGS. 1 to 5 the present state of the art in the field of the present invention.

The embodiment shown in these figures comprises a personal computer 11 which is connected to a conventional memory card 12 of the PCMCIA type.

This card 12 is thus essentially constituted by a buffer memory 13 for communication, a processor 14, an application device 15 and finally a flash memory 16.

According to FIG. 1, the user executes a new function F2 which introduces it into the personal computer 11.

According to FIG. 2, the function F2 is transferred to the buffer memory 13, which transfer is associated with the transfer of the code of said function F2.

According to FIG. 3, the function F2 is then transferred to the flash memory 16 via the processor 14.

FIG. 4 shows the dispatch of the execution request from the flash memory 16 of the function F2 with the parameters P2.

These parameters P2 are located in the buffer memory 13.

Finally, according to FIG. 5, the processor 14 interprets the command received and executes the function F2. Then it instructs the computer associated with the user device 15, of the proper execution of F2 by writing a value V2 in the buffer memory 13.

According to a preferred embodiment, the function F2 is preserved in the memory in the flash memory 16, but this is not necessarily so.

One of the problems of this device according to the state of the art arises from the fact that if several functions F are loaded in the flash memory 16, the assembly of the executable codes can exceed the capacity of the memory. There are then risks of erasure or of saturation of the system.

According to FIGS. 6 to 9, the present invention simplifies substantially the remote loading of a function.

According to FIG. 6, and in a manner analogous to FIG. 1, the user loads the function F1 into the interior of a personal computer 1.

Figure 7:
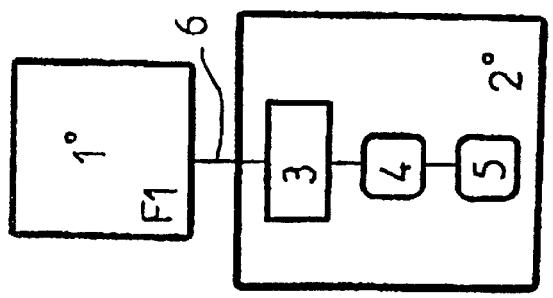

According to FIG. 7, this function F1 is then transmitted via a data transmission channel 6, the function F1 proceeding from the computer 1 in the direction of the PCMCIA type memory card 2 whose structure is characteristic.

This card 2 comprises essentially three important elements, namely the buffer memory 3 permitting direct access to the processor 4 by the card 2, the processor 4 and finally the user device 5.

According to FIG. 7, the function F1 is thus transferred to the buffer memory 3 with direct access simultaneously with the parameters P1.

Figure 8:
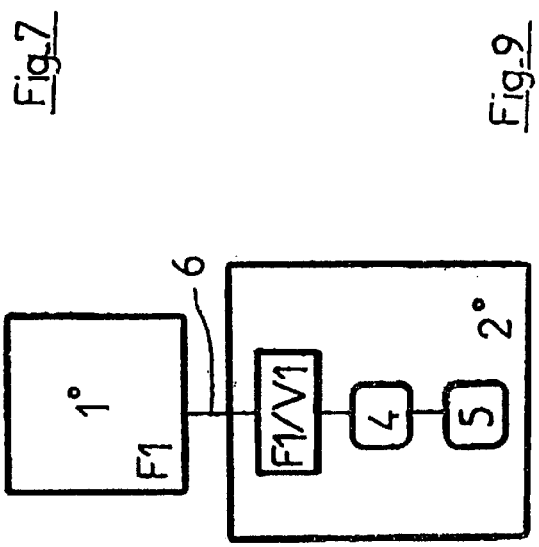

According to FIG. 8, the processor 4 interprets the fact that the buffer memory with direct access 3 is filled, by a function permitting its direct execution by the processor 4. It thus executes F1 with the parameters P1.

Figure 9:
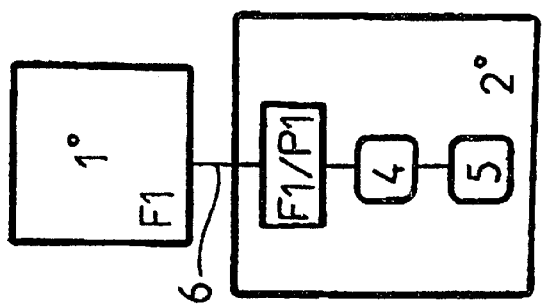

FIG. 9, finally, discloses the inscription of the value V1 after execution of the function F1.

Said function F1 can reside in the buffer memory 3 in the case in which there would be a second successive execution to carry out. Nevertheless, each new function erases the preceding function.

The loading time must be very rapid. It is necessary therefore to have a direct memory access of this card 2 for the personal computer 1 as well as direct access for execution by the processor 4.

In the embodiment according to the invention, the flash memory 16 is thus no longer necessary.

The conventional case, used in the case of a PCMCIA card 12, requires remote loading of a new function F2 by the data transmission channel, interpreted by the processor 14 of the card 12 and then inscribed in the flash memory 16.

Execution thus takes place as soon as all the function F2 is written into said flash memory 16, and when the processor 14 receives the execution command by the data transmission channel.

The conventional case requires a time of about 1 to 2 seconds to load a function of 2 K octets.

The mechanism used within the present invention, uses a principle derived from the DMA.

The principle is to hard wire the data transmission channel such that it will be directly executable by the processor.

If the data channel permits DMA type loading, the host system (a personal computer in the particular case of a PCMCIA card), can then directly access the program space of the processor, there is thus a DPA mechanism.

For example, the DVB specification (Digital Video Broadcasting) used in Europe in 1995 is a particular application of use of the standard PCMCIA, which defines particularly an extremely rapid transfer mechanism permitting writing a buffer memory of data at a speed of the order of 300 nanoseconds per octet.

A load of 2 K octets thus requires a time of 600 microseconds.

According to the invention, this buffer memory 3 being directly executable by the internal processor 4, the remote loading of a new function F1 whose executable code is 2 K octets, thus requires 600 microseconds, which is negligible relative to the two seconds of the conventional systems and also of the time of execution itself (which is of the order of 100 to 500 milliseconds in the case of access to a card with a chip, for example).

This therefore permits causing all of the functions to remain in the personal computer and no longer in the PCMCIA card, and to execute them in the desired time by utilizing rapid loading of the DPA type. The same advantage of simultaneous loading arises in the case of the execution signal of the function, the arguments of said function and the executable code of this function.

The BIOS integrated into the processor (read only memory) permits rendering secure the use of the product.

During use, a new function is loaded by means of a rapid process between the server and the read only memory, then executed instantaneously by the processor under control of the program.

This process has the particular advantage that the time of transfer of this function into the random access memory is negligible relative to the time of execution of the function itself.

In a particular embodiment, the program is replaced by an interpreter. In this case, the preloaded function will be interpreted.

PCMCIA interface can be replaced by any other interface of the same type as the USB (Universal Serial Bus).

REFERENCES

1. Personal computer
2. Memory card of the PCMCIA type
3. Buffer memory permitting direct access to the processor 4 of the card 2
4. Processor of card 2
5. User device of card 2
6. Transmission channel for data from the computer 1 in the direction of card 2
11. Personal computer
12. Memory card of the PCMCIA type
13. Buffer memory for communication of the card 12
14. Processor of the card 12
15. Device for using the card 12
16. Flash memory of the card 12
F1. Execution of a new function in the computer 1 and the card 2
F2. Execution of a new function in the computer 11 and the card 12
P1. Parameters of the execution command of F1
P2. Parameters of the execution command of F2
V1. Display value of the execution of F1
V2. Display value of the execution of F2

What is claimed is:

1. A process for rapid remote loading of executable function code (F1) between i) a host computer (1) having a host processor, a memory, and an input/output unit serving as a port and ii) a memory card or input/output card of the PCMCIA type (2) having a buffer memory (3), a processor (4) and a user device (5), with an interface between the input/output unit of the host computer and the memory card or input/output card, comprising the steps of:

utilizing a buffer memory (3) with direct access for the loading of the executable function code (F1) from the host computer (1) to the processor (4);

loading the executable function code (F1) from the host computer (1) into the buffer memory (3); and transmitting directly from the buffer memory (3) to the processor (3), the executable function code (F1) for execution by the processor (4), wherein the loading of the executable function code from the host computer into the buffer memory is with auto-incrementation of addresses of memory blocks, the processor reads memory blocks thus-loaded with auto-incrementation of the addresses, and the loading of the executable function code is from the host computer to the buffer memory to the processor without storage of the executable function code within a nonvolatile memory within the memory card or input/output card.

2. The process of claim 1 for rapid remote loading of executable function code (F1) between i) a host computer and ii) a memory card or input/output card of the PCMCIA type, wherein the processor (4) executes the executable function code incrementally as the executable function code is written into the buffer memory (3) to permit the loading and execution of the executable function code in real time.

3. The process of claim 1 for rapid remote loading of executable function code (F1) between i) a host computer and ii) a memory card or input/output card of the PCMCIA type, wherein the process uses a personal computer as the host computer.

4. The process of claim 1 for rapid remote loading of executable function code (F1) between i) a host computer and ii) a memory card or input/output card of the PCMCIA type, wherein the process uses a Universal Serial Bus as the interface between the host computer and the memory card or input/output card.

5. The process of claim 1 for rapid remote loading of executable function code (F1) between i) a host computer and ii) a memory card or input/output card of the PCMCIA type, wherein the process uses a PCMCIA interface as the interface between the host computer and the memory card or input/output card.

* * * * *